(12) United States Patent
Nagaoka et al.

(10) Patent No.: US 8,607,551 B2
(45) Date of Patent: Dec. 17, 2013

(54) EXHAUST GAS PURIFIER AND SYSTEM FOR EXHAUST GAS PURIFICATION

(75) Inventors: Daiji Nagaoka, Fujisawa (JP); Teruo Nakada, Fujisawa (JP); Hiroyuki Yuza, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 369 days.

(21) Appl. No.: 12/736,747

(22) PCT Filed: Jun. 1, 2009

(86) PCT No.: PCT/JP2009/060003
§ 371 (c)(1),
(2), (4) Date: Nov. 5, 2010

(87) PCT Pub. No.: WO2009/148024
PCT Pub. Date: Dec. 10, 2009

(65) Prior Publication Data
US 2011/0047990 A1 Mar. 3, 2011

(30) Foreign Application Priority Data
Jun. 3, 2008 (JP) ................. 2008-145802

(51) Int. Cl.
*F01N 3/00* (2006.01)
*F01N 3/10* (2006.01)

(52) U.S. Cl.
USPC ................... 60/295; 60/297; 60/299; 60/301; 60/303

(58) Field of Classification Search
USPC ............ 60/286, 295, 297, 299, 301, 303, 311
See application file for complete search history.

(56) References Cited

U.S. PATENT DOCUMENTS

| 5,950,423 A | 9/1999 | Hampton |
| 6,928,806 B2 | 8/2005 | Tennison et al. |
| 2006/0257303 A1* | 11/2006 | Telford ............... 423/239.1 |
| 2008/0041053 A1 | 2/2008 | Doring et al. |
| 2008/0271442 A1* | 11/2008 | Baumgartner ............ 60/302 |
| 2009/0173063 A1* | 7/2009 | Boorse et al. ............. 60/299 |

FOREIGN PATENT DOCUMENTS

| JP | 11-350941 | 12/1999 |
| JP | 2002-276422 | 9/2002 |
| JP | 2005-342638 | 12/2005 |
| JP | 2005-344597 | 12/2005 |

(Continued)

OTHER PUBLICATIONS

International Search Report for PCT/JP2009/060003, mailed Jul. 14, 2009.

(Continued)

*Primary Examiner* — Kenneth Bomberg
*Assistant Examiner* — Audrey K Bradley
(74) *Attorney, Agent, or Firm* — Staas & Halsey LLP

(57) ABSTRACT

An exhaust gas purifier including an NOx catalyst of the selective reduction type and a diesel particulate filter arranged in series, and being disposed in an exhaust passage of an internal combustion engine. The purifier includes a passage for urea supply having a hydrolysis catalyst therein and a passage for hydrocarbon supply having an oxidation catalyst therein. The passages are parallel to each other and separate on an upstream side of both the NOx catalyst and the diesel particulate filter. A urea feeder which supplies urea to the passage for urea supply and a hydrocarbon feeder supplies hydrocarbon to the passage for hydrocarbon supply. The injection of an urea is thereby reconciled with the direction injection of hydrocarbon into the exhaust pipe in a compact space.

7 Claims, 4 Drawing Sheets

(56) References Cited

FOREIGN PATENT DOCUMENTS

| | | |
|---|---|---|
| JP | 2006-266192 | 10/2006 |
| JP | 2006-342737 | 12/2006 |
| JP | 2008-291695 | 12/2008 |
| WO | 2007/085646 A1 | 8/2007 |

OTHER PUBLICATIONS

Chinese Office action mailed Mar. 19, 2013 for corresponding Chinese Application No. 200980120739.3.

* cited by examiner

EXHAUST GAS PURIFIER AND SYSTEM FOR EXHAUST GAS PURIFICATION

TECHNICAL FIELD

The present invention relates to an exhaust gas purifier allowing establishment of a purifier in a compact space and at a low cost, the exhaust gas purifier including a NOx catalyst of the selective reduction type and a diesel particulate filter ("DPF") and being used in a system for exhaust gas purification for performing injection of a urea water and direct injection of fuel into an exhaust pipe, and relates to the system for exhaust gas purification.

BACKGROUND ART

As for internal combustion engines mounted in automobiles, it is important to reduce NOx (nitrogen oxides) and PM (particulate matter) contained in the exhaust gas. One of the methods for purifying the exhaust gas in order to reduce the NOx is a method for exhaust gas purification in which an ammonia solution, such as urea, is injected into an exhaust pipe so as to generate ammonia by hydrolysis, and a NOx catalyst of the selective reduction type (SCR catalyst) selectively reducing NOx on an adsorption material, such as zeolite.

This SCR (Selective Catalytic Reduction) system is widely used as an aftertreatment device for exhaust gas from diesel engines. In this SCR system for diesel engines, NOx has to be reduced in an oxidative atmosphere. For this reason, a reducing agent, such as aqueous solutions of ammonia ($NH_3$) and urea ($NH_2)_2CO$ (urea water), is supplied to the exhaust gas, and then NOx is decomposed into nitrogen ($N_2$) and water ($H_2$) by a NOx catalyst of the selective reduction type which has selectively adsorbed NOx in the exhaust gas, thereby being discharged.

When urea or an aqueous solution of urea is supplied, urea is hydrolyzed by heat of the exhaust gas in the reaction: $(NH_2)_2CO+H_2O \rightarrow 2NH_3+CO_2$ to generate $NH_3$. Then, in the NOx catalyst of the selective reduction type, NOx is reduced to be purified mainly in the reaction: $NO+NO_2+2NH_3 \rightarrow 2N_2+3H_2O$. It should be noted that an oxidation catalyst may be disposed in some cases in the downstream side so that surplus $NH_3$ flowing out to the downstream side of the NOx catalyst of the selective reduction type can be oxidized to be removed in the reaction: $4NH_3+3O_2 \rightarrow 2N_2+6H_2O$.

In the meantime, as one of the methods for reducing PM, a DPF (diesel particulate filter) is available which temporarily traps PM with a filter made of ceramic or the like so as to reduce PM while regenerating the filter by burning thus trapped PM for removal. In this DPF, HCs (hydrocarbons), such as fuels, are supplied to be burned. Thus generated combustion heat is used to raise the temperature of the DPF so that the trapped PM can be burned to be removed. It should be noted that catalyst-supported DPFs are also widely used in which a precious metal catalyst is supported on a filter so that a combustion initiation temperature of PM can be lowered.

In the prior art, post injection has been the most common method for supplying HCs, the post injection performing fuel injection during the expansion stroke in the combustion cycle inside a cylinder. However, since injection is performed in this post injection when the temperature inside the cylinder drops, a part of the fuel falls from the cylinder liner into oil. This brings about a problem of oil dilution, in which lubricating oil is diluted with the fuel. For this reason, in recent years, it is more preferred that HCs, such as fuels, be directly injected into an exhaust pipe.

However, the following problem is involved in a system for exhaust gas purification employing both a catalyst of the selective reduction type and a DPF. In general, when a NOx catalyst of the selective reduction type is used, an oxidation catalyst (DOC) is disposed in the upstream of the NOx catalyst of the selective reduction type. This is because the optimal condition for the reduction reaction of NOx can be achieved when the ratio between NO (nitrogen monoxide) and $NO_2$ (nitrogen dioxide) is NO:$NO_2$=50:50, and therefore, a condition close to this condition is to be achieved by oxidizing NO to $NO_2$ with the oxidation catalyst.

In the meantime, when injection is performed with an injection valve for injecting an ammonia solution disposed in the upstream side of the oxidation catalyst, $NO_2$ is generated from $NH_3$ (ammonia) by the oxidation catalyst. For this reason, this injection valve needs to be disposed downstream of the oxidation catalyst and upstream of the NOx catalyst of the selective reduction type. Further, mixing of the exhaust gas and ammonia largely affects the purification rate of NOx in a NOx catalyst of the selective reduction type. Accordingly, it is generally necessary to provide a mixer in the upstream side of the NOx catalyst of the selective reduction type for the purpose of increasing the mixing effect.

On the other hand, a fuel injection valve for direct injection into an exhaust pipe for the purpose of regeneration of DPF needs to be disposed in the upstream side of the oxidation catalyst so that HCs can be oxidized by the oxidation catalyst to generate heat. In order to achieve this, in arrangement in the prior art, as shown in FIG. 4, a case 10X for an oxidation catalyst (DOC) 17 and a catalyst-supported DPF (CSF) 14 and a case 10Y for a NOx catalyst of the selective reduction type (SCR) 12 are formed independently from each other, and a fuel injection valve 21 and an injection valve 20 for an ammonia solution are provided in the upstream sides of the cases 10Y and 12, respectively.

However, in such a system 1x for exhaust gas purification, since a mixer 27 is disposed after the injection valve 21 for an ammonia solution, the system becomes large scale. Therefore, there arise problems that arrangement (layout) in installation of this system into automobiles and the like is difficult, and that costs for the system are high.

As one of the countermeasures taken for this, for example, as described in Japanese patent application Kokai publication No. 2006-266192, an apparatus for purifying the exhaust gas of engines is proposed, which has a relatively simple structure in which a second oxidation catalyst, a liquid injection nozzle for supplying an aqueous solution of urea, a catalyst of the selective reduction type (SCR catalyst), a first oxidation catalyst, and a DPF are provided in order from the upstream side of an exhaust passage; and the catalyst of the selective reduction type, the first oxidation catalyst and the DPF are housed in a single converter.

In this apparatus for purifying the exhaust gas of engines, while the NOx purification efficiency on the catalyst of the selective reduction type is improved by oxidizing NO in the exhaust gas to $NO_2$ with the second oxidation catalyst, the amount of hydrocarbons in the exhaust gas is increased and decreased by post injection, and the hydrocarbons are oxidized by the catalyst of the selective reduction type and the first oxidation catalyst so as to generate heat. Thereby, PM trapped by the DPF is burned to be removed.

However, in this apparatus for purifying the exhaust gas of engines, since HCs, such as fuels, are injected into the exhaust pipe not by direct injection but by post injection, a part of the fuel at the time of the post injection falls from the cylinder liner to oil. This brings about a problem of oil dilution, in which the lubricating oil is diluted with the fuel. In addition, there is a problem that, by using post injection, this apparatus would not be a useful reference for making a system for exhaust gas purification more compact in the case of achieving both urea supply and HC supply by direct injection of HCs into an exhaust pipe.

SUMMARY OF THE INVENTION

The present invention has been carried out in view of the circumstances described above, and an object thereof is to provide an exhaust gas purifier capable of reconciling injection of an ammonia solution with direct injection of HCs into an exhaust pipe in a compact space in a system for exhaust gas purification employing both a NOx catalyst of the selective reduction type (SCR catalyst) and a DPF, and to provide the system for exhaust gas purification.

An exhaust gas purifier achieving the above-described object is an exhaust gas purifier which includes a NOx catalyst of the selective reduction type and a DPF arranged in series to each other, and which is disposed in an exhaust passage of an internal combustion engine, the exhaust gas purifier including: a passage for urea supply having a hydrolysis catalyst deposited therein and a passage for HC supply having an oxidation catalyst deposited therein, the passages being deposited in parallel to each other on the upstream side of both the NOx catalyst of the selective reduction type and the DPF; a urea feeder which supplies urea to the passage for urea supply; and an HC feeder which supplies HCs to the passage for HC supply.

Here, the hydrolysis catalyst is a catalyst which decomposes urea to a urea water and ammonia, and is made of titanium oxide or the like. The oxidation catalyst is a catalyst which oxidizes HC (hydrocarbon), CO (carbon monoxide) and the like, and is made mainly of a precious catalyst, such as platinum. Incidentally, NOx catalysts of the occlusion reduction type include oxidation catalysts. Further, in respect to the positional arrangement of the NOx catalyst of the selective reduction type and the DPF, any one of them can be arranged in the upstream side of the other.

In this constitution, urea and HCs can be independently supplied by the respective passages. This allows reconciliation of injection of urea into an exhaust pipe with direct injection of HCs into the exhaust pipe in a short and compact exhaust gas purifier. Then, when urea is supplied by the urea feeder, urea is hydrolyzed by the hydrolysis catalyst to ammonia; therefore, the ammonia can be supplied to the NOx catalyst of the selective reduction type. Further, together with this, NO in the exhaust gas is oxidized by the oxidation catalyst so as to achieve No:$NO_2$ of 50:50, thereby being able to increase the NOx reduction efficiency in the NOx catalyst of the selective reduction type.

Further, in air-fuel ratio rich control for the purpose of DPF regeneration, when HCs are injected by the HC feeder, HCs are oxidized by the oxidation catalyst, and the heat generated by the oxidation can raise the temperature of the exhaust gas flowing into the DPF device. Accordingly, PM trapped by the DPF can be efficiently burned and then removed.

In the exhaust gas purifier described above, the hydrolysis catalyst and the oxidation catalyst are disposed in the same cross-sectional surface of the exhaust passage, and a partition separating exhaust gas flowing into both of the catalysts is disposed, with respect to the flow direction of the exhaust gas: all over both of the catalysts or a part thereof in the upstream side thereof; only upstream of both of the catalysts; and from the upstream of both of the catalysts to all over both of the catalysts or to a part of the upstream side thereof.

In this constitution, the exhaust gas purifier can be made short and compact, and heat of the oxidation reaction generated in the oxidation catalyst can be used in the adjacent hydrolysis catalyst. The hydrolysis reaction in which urea is decomposed to ammonia is an endothermic reaction. Accordingly, by using the heat generated in the oxidation reaction, which is an exothermic reaction, ammonia can be efficiently generated from urea. Here, it is preferable that the hydrolysis catalyst and the oxidation catalyst be arranged in such a way as to facilitate mixing of exhaust gas having passed through these catalysts. For example, one is arranged inside, and the other is arranged in an outer circumferential side so as to surround the one. In addition, exhaust gas generally has a higher temperature inside thereof. Accordingly, when the oxidation catalyst is arranged in the outer circumferential side, a drop in the temperature of the hydrolysis catalyst located inside and a decrease in the hydrolysis efficiency caused by this drop in the temperature can be prevented.

In the exhaust gas purifier described above, at least one of a support of the hydrolysis catalyst and a support of the oxidation catalyst is formed by a support having a function of mixing exhaust gas. In this constitution, the exhaust gas in the downstream side of both of the catalysts has ammonia and heat diffusing therein, and then flows into the NOx catalyst of the selective reduction type and the DPF which are located in the downstream side. For this reason, purification of NOx in the exhaust gas can be performed efficiently, and removal of PM by burning in the DPF can also be performed efficiently. It should be noted that, even when the partition between these catalysts is disposed all over both of the catalysts with respect to the flow direction of the exhaust gas, the flow direction of the exhaust gas coming out of the catalysts is diversified, thereby generating a mixing effect. Thus, effects in the above-described purification of NOx and regeneration of DPF can be demonstrated.

In the exhaust gas purifier described above, at least one of the support of the hydrolysis catalyst and the support of the oxidation catalyst is formed with a metal support. In this constitution, it is possible to immediately supply heat generated in the oxidation catalyst to the hydrolysis catalyst.

In the exhaust gas purifier described above, a NOx catalyst of the occlusion reduction type is additionally deposited in series to the NOx catalyst of the selective reduction type and the DPF. In this constitution, the NOx catalyst of the occlusion reduction type demonstrates its function of NOx purification at a lower temperature than the activation temperature of the NOx catalyst of the selective reduction type. Accordingly, the temperature range of exhaust gas for NOx purification, that is, the driving region of the engine, is expanded.

In the exhaust gas purifier described above, when a NOx catalyst of the occlusion reduction type instead of the DPF is provided as a catalyst to be deposited in the passage for HC supply, equivalent operation and effect can be exerted in the HC oxidation to those of an oxidation catalyst. In regard to NOx, since NOx purification performance by the NOx catalyst of the occlusion reduction type having a lower activation temperature than that of the NOx catalyst of the selective reduction type, the temperature range for the NOx purification can be expanded.

In the exhaust gas purifier described above, when the DPF is formed with a catalyst-supported DPF supporting therein an oxidation catalyst and a PM oxidation catalyst, it is preferable to dispose this catalyst-supported DPF in the downstream side of the NOx catalyst of the selective reduction type in order to avoid hydrolyzed ammonia from being oxidized to $NO_2$.

Further, a system for exhaust gas purification to achieve the above-described object includes the exhaust gas purifier described above. In this constitution, equivalent effects can be exerted to those of the exhaust gas purifiers described above.

With the exhaust gas purifier and the system for exhaust gas purification according to the present invention, it is possible to reconcile injection of an ammonia solution with direct injection of HCs into an exhaust pipe in a compact device in a system for exhaust gas purification which employs both a NOx catalyst of the selective reduction type (SCR catalyst) and a DPF. Further, such compactness allows a reduction of the amount of emitted heat, thereby expanding a driving region of an engine where catalysts are activated.

DESCRIPTION OF THE EMBODIMENTS

Figure 1:
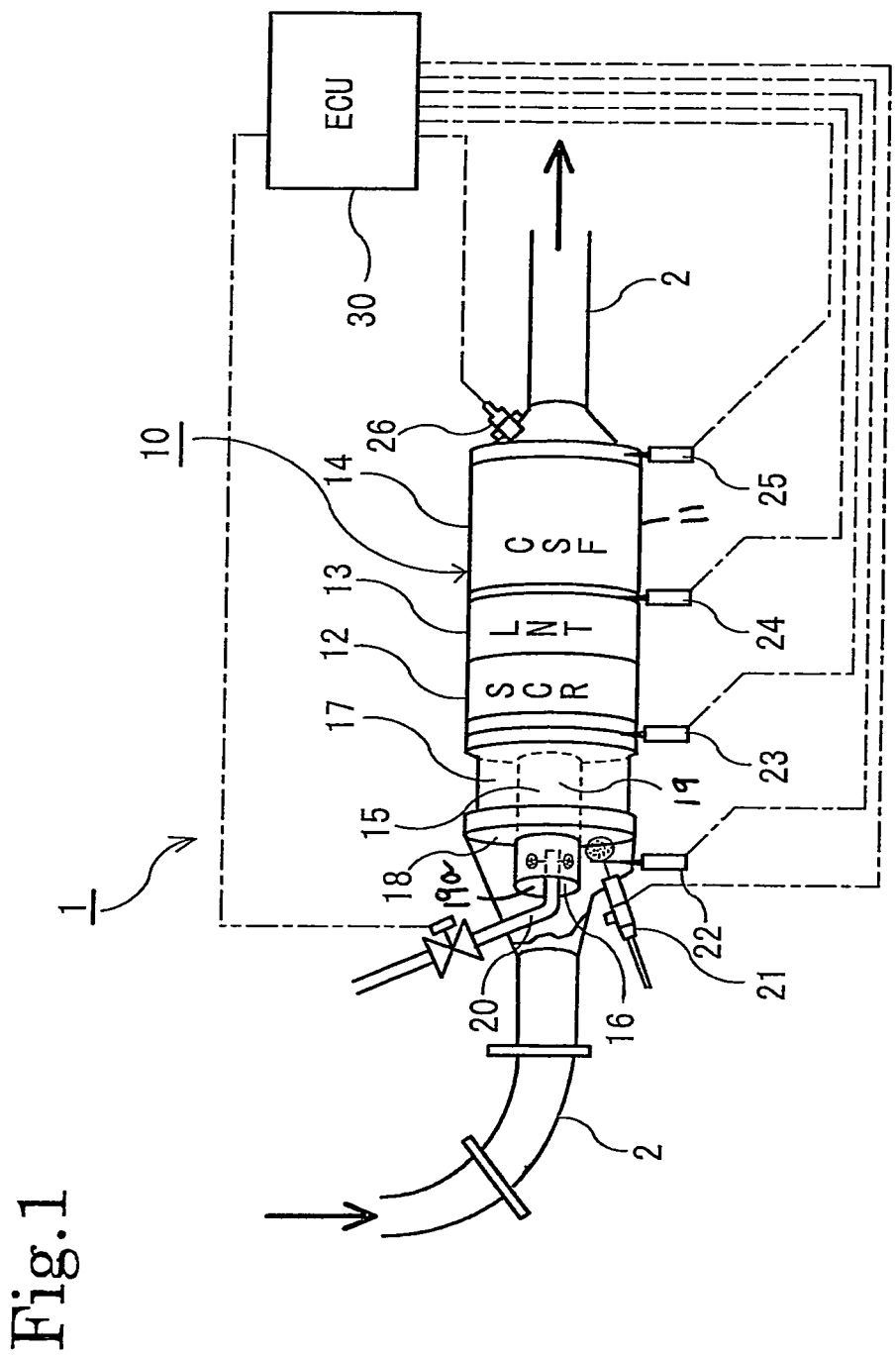
FIG. 1 is a view schematically showing a constitution of an exhaust gas purifier and a system for exhaust gas purification of an embodiment according to the present invention.

Hereinafter, an exhaust gas purifier and a system for exhaust gas purification of an embodiment according to the present invention will be described by referring to the drawings.

FIG. 1 shows a constitution of an exhaust gas purifier 10 and a system for exhaust gas purification 1 of an embodiment of the present invention. This exhaust gas purifier 10 is arranged in an exhaust passage 2 of an engine, and includes in a single case thereof, in order from the upstream side thereof: a NOx catalyst 12 of the selective reduction type (SCR); a NOx catalyst 13 of the occlusion reduction type (LNT); and a catalyst-supported DPF (CSF) 14.

It should be noted that, in the case of the combination of these three exhaust gas purifiers 12, 13, and 14, it is necessary to dispose the NOx catalyst 12 of the selective reduction type (SCR) in the most upstream side in order to avoid oxidation of ammonia. The NOx catalyst 13 of the occlusion reduction type (LNT) and the catalyst-supported DPF (CSF) 14 may change places with each other. Further, in the case of using a DPF supporting no catalyst instead of using the catalyst-supported DPF 14, the DPF may be arranged in the upstream side of the NOx catalyst 12 of the selective reduction type (SCR).

The NOx catalyst 12 of the selective reduction type (SCR) is formed in such a way that a support having a honeycomb structure or the like made of cordierite, aluminum oxide, titanium oxide, or the like supports titania-vanadium, β-type zeolite, chrome oxide, manganese oxide, molybdenum oxide, titanium oxide, tungsten oxide, or the like. In this constitution, $NH_3$ (ammonia) is adsorbed, and thus adsorbed $NH_3$ is used for reduction purification of NOx.

The NOx catalyst 13 of the occlusion reduction type is formed in such a way to support an alkali metal or an alkali earth metal together with a precious metal. This catalyst 13 oxidizes NOx in exhaust gas containing an excess amount of oxygen so as to adsorb NOx in the form of nitrate salts on the catalyst, thereby purifying NOx. This NOx catalyst 13 of the occlusion reduction type occludes NOx in a lean state in terms of an air-fuel ratio of the exhaust gas, but releases occluded NOx in a rich state in the air-fuel ratio while reducing thus released NOx at the same time in a reducing atmosphere. By this, NOx is reduced.

It should be noted that, the function of NOx occlusion of the NOx catalyst 13 of the occlusion reduction type can be demonstrated at a lower temperature than the activation temperature of the NOx catalyst 12 of the selective reduction type. Therefore, with the NOx catalyst 13 of the occlusion reduction type provided, the function of NOx purification has a wider window of NOx purification than that in the case of using the NOx catalyst 12 of the selective reduction type alone. Therefore, it is possible to purify NOx in a wider range of temperature. In other words, the range of the temperature of the exhaust gas enabling NOx purification can be expanded; thus, the driving region of an engine enabling NOx purification is expanded.

The catalyst-supported DPF 14 is formed with a wall-flow type filter of a monolith honeycomb structure, which is obtained by alternatively sealing inlets and outlets of channels of porous ceramic honeycomb, or the like. This filter part supports an oxidation catalyst, such as platinum and palladium, and a PM oxidation catalyst, such as cerium oxide. PM in the exhaust gas is trapped by the porous ceramic wall.

The hydrolysis catalyst 15 is generally formed by applying a catalyst coat layer made of aluminum oxide or the like supporting a hydrolysis catalyst, such as titanium oxide, to a support having a porous ceramic honeycomb structure, such as a cordierite honeycomb. However, considering the difficulty in immovably supporting (canning) of the catalyst to a case, it is preferable to use a metal support or a support made of a material having a specific heat equivalent to that of metal. This allows achieving a uniform temperature of the hydrolysis catalyst 15. In addition, it is preferable to impart a function of mixing exhaust gas, in other words, a function of diffusing exhaust gas.

The oxidation catalyst 17 is generally formed by applying a catalyst coat layer of aluminum oxide or the like supporting an oxidation catalyst, such as platinum, to a support having a porous ceramic honeycomb structure, such as a cordierite honeycomb. Similarly to the hydrolysis catalyst 15, considering the difficulty in immovably supporting of this oxidation catalyst 17, it is as well preferable to use a metal support. This allows immediate supplying of heat generated in the oxidation catalyst 17 to the hydrolysis catalyst 15. In addition, it is preferable to impart a function of mixing exhaust gas, in other words, a function of diffusing exhaust gas.

Figure 2:
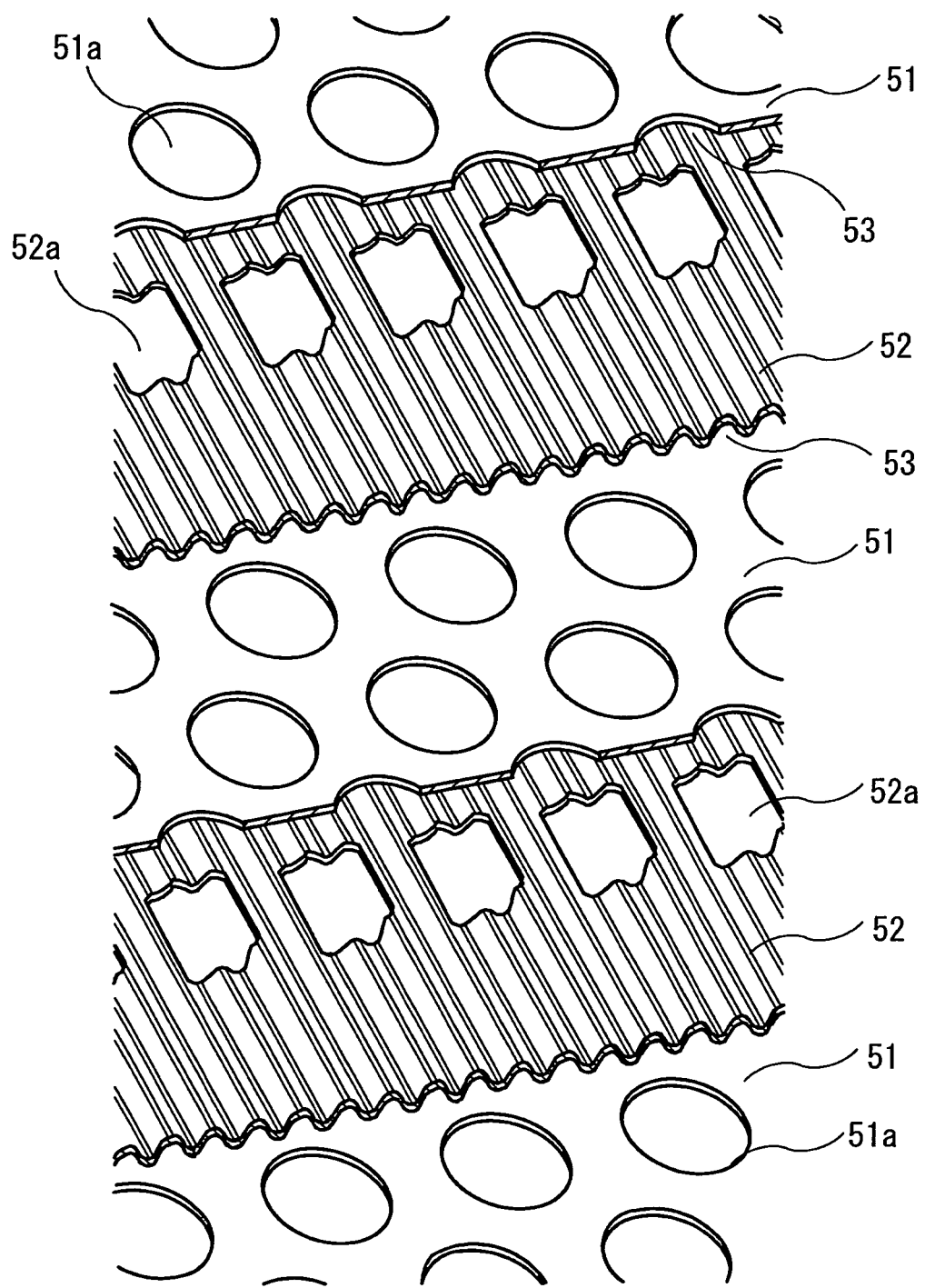
FIG. 2 is a view schematically showing a perforated structure ("PE") structure in which a perforated flat foil and a perforated corrugated foil are stacked one above the other.
Figure 3:
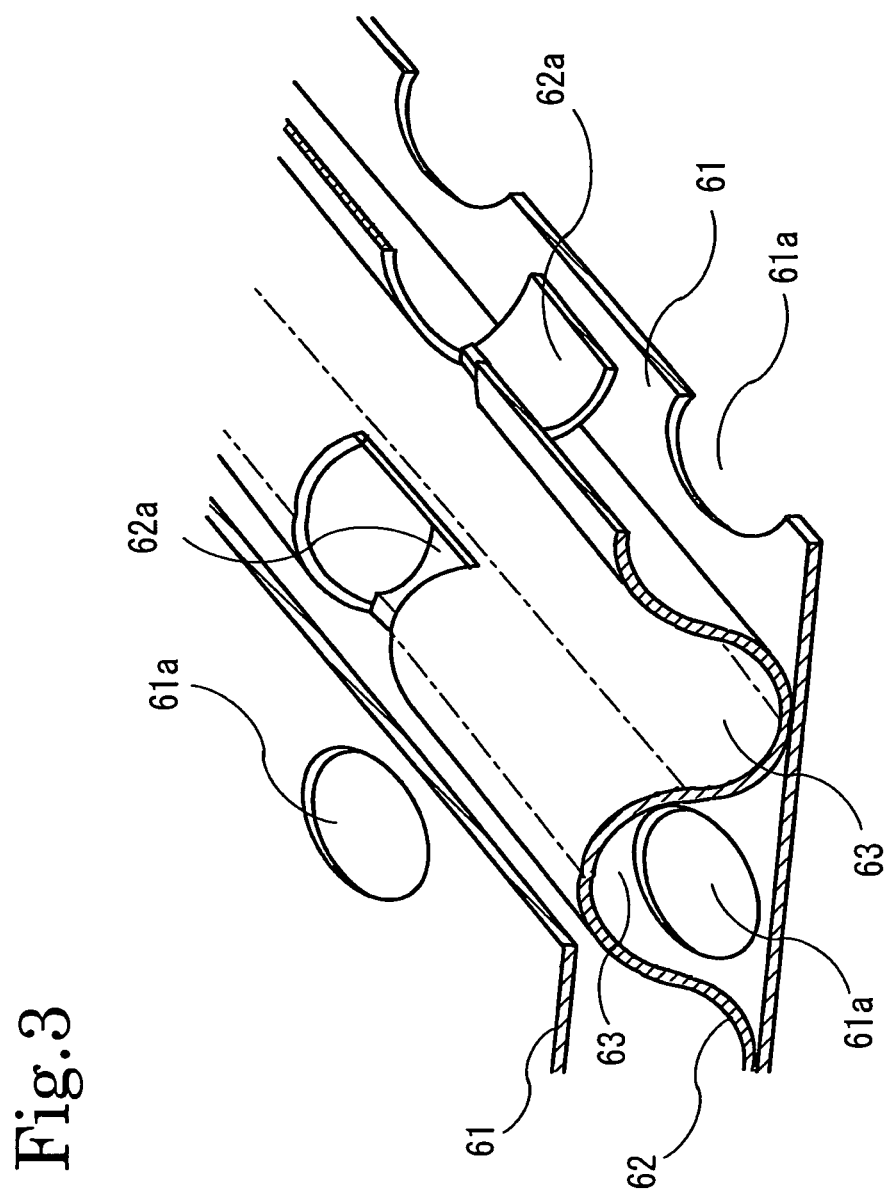
FIG. 3 is a view schematically showing a longitudinal structure ("LS") structure in which a perforated flat foil and a notched corrugated foil are stacked one above the other.
Figure 4:
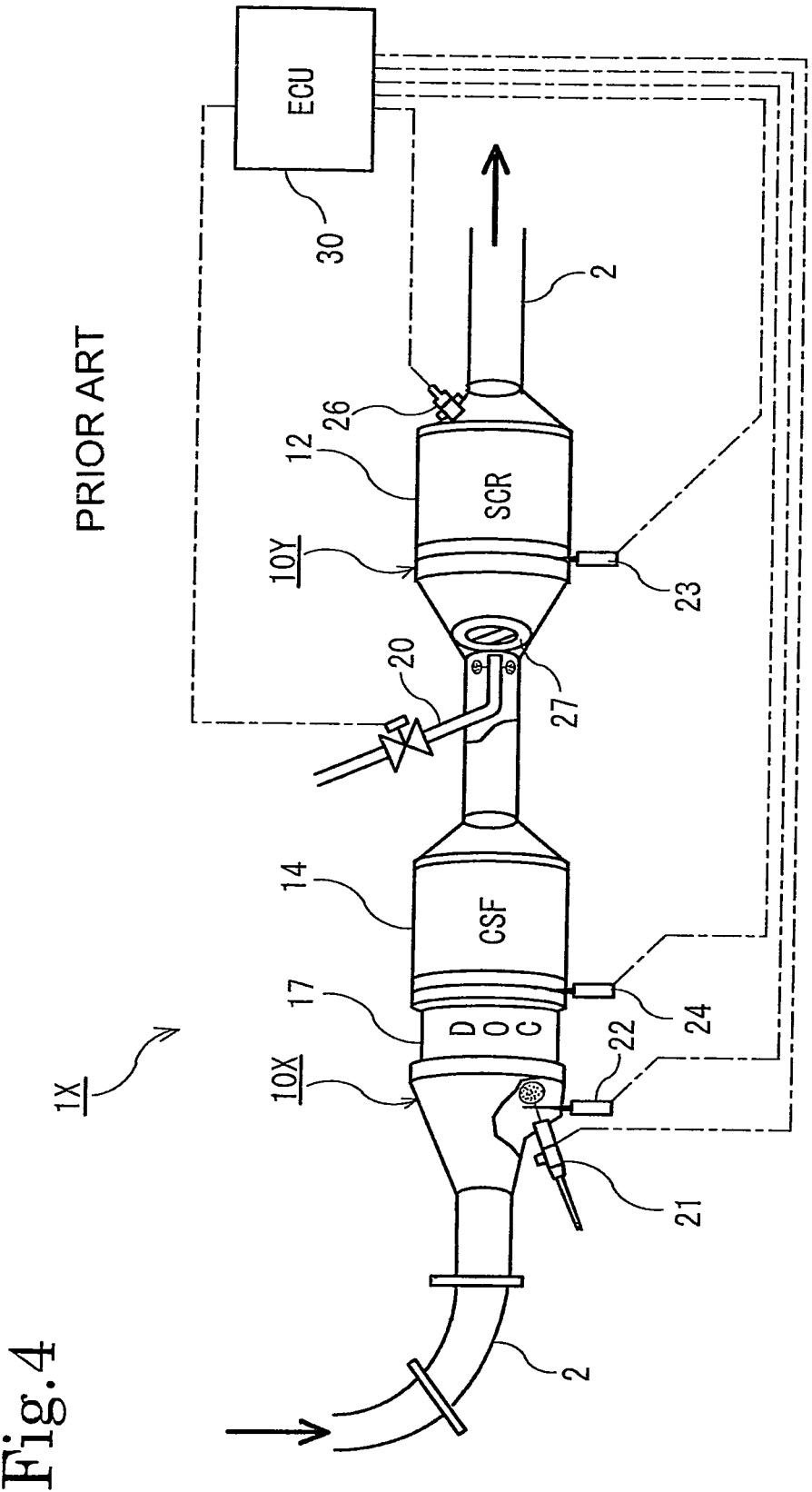
FIG. 4 is a view schematically showing a constitution of an exhaust gas purifier and a system for exhaust gas purification of the prior art.

As a metal support having such a mixing function, a PE (Perforated) structure (name by EMITEC Inc., Germany) as shown in FIG. 2, a LS (Longitudinal Structure) structure (name by EMITEC Inc., Germany) as shown in FIG. 3, and the like can be used. This PE structure is a structure as shown in FIG. 2 having a metal perforated flat foil 51 and a metal perforated corrugated foil 52 stacked one above the other so as to allow circulation among channels 53. Perforations 51a and 52a have a diameter of, for example, approximately 8 mmø, and the porosity is approximately 35%. The LS structure is a structure as shown in FIG. 3 having a metal flat foil 61 with perforations 61a and a metal corrugated foil 62 having notches (depressed portion) 62a in a corrugation portion stacked one above the other so as to allow circulation among channels 63. By having such a notch 62b in this LS structure, a wave shape is formed in a direction perpendicular to the axis of the channel. In the case of forming into a cylinder shape, the flat foils 51 and 61 and the corrugated foils 52 and 62 stacked one above the other, respectively, are rolled up into a cylinder shape. This eliminates necessity of a mixer for mixing exhaust gas.

Incidentally, when a NOx catalyst of the occlusion reduction type instead of the oxidation catalyst 17 is provided as a catalyst to be deposited in a passage for HC supply 18, equivalent operation and effect can be exerted to those of the oxidation catalyst in terms of the function of HC oxidation. Moreover, in regard to NOx, since the NOx purification performance by the NOx catalyst of the occlusion reduction type having a lower activation temperature than that of the NOx catalyst 12 of the selective reduction type can be demonstrated, the temperature range for the NOx purification can be expanded.

As for both of these catalysts, for example, in a single support having a honeycomb structure, the hydrolysis catalyst 15 is supported in a center side while the oxidation catalyst is supported in an outer circumferential side of the hydrolysis catalyst 15, and the inside is used as a passage for urea supply 16 while the outer circumferential side is used as the passage for HC supply 18 for the oxidation catalyst 17. By this, the hydrolysis catalyst 15 and the oxidation catalyst 17 can be deposited in the same cross-sectional surface of the exhaust gas passage of the exhaust gas purifier 10.

Further, together with that, a partition 19 separating exhaust gas flowing into these catalysts 15 and 17 is disposed, with regard to the flow direction of the exhaust gas: all over both of the catalysts 15 and 17 or a part thereof in the upstream side thereof; only upstream of both of the catalysts 15 and 17; and from the upstream of both of the catalysts 15 and 17 to all over both of the catalysts 15 and 17 or to a part of the upstream side thereof. In FIG. 1, the partition 19 formed with a pipe 19a is disposed all over both of these catalysts 15 and 17 with regard to the flow direction of the exhaust gas, and is further disposed so as to extend to the upstream side.

By this, the hydrolysis catalyst 15 and the oxidation catalyst 17 can be disposed in the same cross-sectional surface of the exhaust gas passage of the exhaust gas purifier 10, and the partition 19 separating the exhaust gas flowing into these catalysts 15 and 17 can be disposed, with regard to the flow direction of the exhaust gas, both all over both of these catalysts 15 and 17 and in the upstream side thereof. Note that, depending of the diffusion effect and the mixing effect, the partition 19 may be disposed in an upstream part of these catalysts 15 and 17 or only in the upstream side of the catalysts 15 and 17.

In this constitution, the partition 19 is disposed at the border between the passage for urea supply 16 and the passage for HC supply 18, and the passage for urea supply 16 having the hydrolysis catalyst 15 deposited therein and the passage for HC supply 18 having the oxidation catalyst (or a NOx catalyst of the occlusion reduction type) 17 deposited therein are disposed in parallel to each other in the upstream side of the NOx catalyst 12 of the selective reduction type.

In addition, a urea injection valve 20 is disposed on the inside of the pipe 19a thus extending to the upstream side, and a fuel injection valve 21 is disposed on the outside thereof. Here, it is formed that exhaust gas flows into these catalysts 15 and 17 substantially evenly. In other words, at an inlet side portion of the case 11, the urea injection valve 20 as a urea feeder which supplies urea to the passage for urea supply 16 and the fuel injection valve 21 as a HC feeder which supplies HC to the passage for HC supply 18 are disposed.

The urea injection valve 20 serving as a urea injecting injector is connected to a urea storage tank, which is not shown in the drawing, by a pipe, which is not shown in the drawing, so as to supply urea and urea water. The urea is hydrolyzed by the hydrolysis catalyst 15 to generate ammonia, and this ammonia is supplied to the NOx catalyst 12 of the selective reduction type.

The fuel injection valve 21 serving as a HC feeder is connected to a HC storage tank, which is not shown in the drawing, by a pipe, which is not shown in the drawing. In the case of burning PM trapped by the catalyst-supported DPF 14 for removal thereof, when the temperature of the exhaust gas is low, unburned HCs, such as fuels, are supplied into the exhaust gas through this fuel injection valve 21. By oxidizing the unburned HCs by the oxidation catalyst 17, thereby generating heat of combustion, the temperature of the exhaust gas is raised by the heat. Then, the exhaust gas having the temperature thus raised is caused to flow into the catalyst-supported DPF 14, so that trapped PM can be burned to be removed. It should be noted that, according to this direct injection of HCs into the exhaust pipe, the problem of oil dilution, in which unburned fuel is mixed into lubricating oil in post injection, thereby diluting the lubricating oil, can be avoided compared to the case of performing post injection in the fuel injection control inside the cylinder.

By having such constitution, the exhaust gas purifier 10 can be made short and compact. Accordingly, heat of oxidation reaction generated in the oxidation catalyst 17 can be used in the adjacent hydrolysis catalyst 15. As a result, the hydrolysis reaction decomposing urea to ammonia, which is an endothermic reaction, can use the heat generated in the oxidation reaction, which is an exothermic reaction; therefore, it is possible to efficiently generate ammonia from urea.

Here, the arrangement of the hydrolysis catalyst 15 and the oxidation catalyst 17 should be an arrangement facilitating mixing of the exhaust gas passed through these catalysts 15 and 17. Exhaust gas generally has a higher temperature inside thereof. Accordingly, when the oxidation catalyst 17 is arranged in the outer circumferential side as described above, a drop in the temperature of the hydrolysis catalyst 15 located inside and a decrease in the hydrolysis efficiency due to this drop in the temperature can be prevented.

An exhaust temperature sensor 22 at an oxidation catalyst 17 inlet is disposed at the upstream side of the oxidation catalyst 17, an exhaust temperature sensor 23 at a NOx catalyst inlet is disposed between the oxidation catalyst 17 and the NOx catalyst 12 of the selective reduction type, an exhaust temperature sensor 24 at a catalyst-supported DPF inlet is disposed between the NOx catalyst 13 of the occlusion reduction type and the catalyst-supported DPF 14, and an exhaust temperature sensor 25 at a catalyst-supported DPF outlet is disposed in the downstream side of the catalyst-supported DPF 14. Meanwhile, a NOx sensor 26 is disposed in the downstream side of the catalyst-supported DPF 14. Further, although not shown in the drawing, a differential pressure sensor which measures a pressure difference before and after the catalyst-supported DPF 14 in order to estimate the degree of PM accumulation in the catalyst-supported PDF 14 is also provided.

Detected values of these sensors are entered into a control unit (ECU: engine control unit) 30 which performs overall control over driving of the engine. Output from this control unit 30 controls not only the engine but also the urea injection valve 20 and the fuel injection valve 21.

In the system for exhaust gas purification 1 employing the exhaust gas purifier 10 described above, at the time of urea injection, urea or urea water is injected from the urea injection valve 20 only to the hydrolysis catalyst 15, thereby generating ammonia by hydrolysis. By using thus generated ammonia as a reductant, NOx is reduced by the NOx catalyst 12 of the selective reduction type. In the meantime, the oxidation reaction of NO→NO$_2$ progresses in the oxidation catalyst 17 located in the outer circumferential side of the hydrolysis catalyst 15, so that the NOx reduction reaction in the NOx catalyst 12 of the selective reduction type can be facilitated.

For the air-fuel ratio rich control performed in DPF regeneration control for burning PM trapped by the catalyst-supported DPF 14 for removal thereof, at the time of HC injection which supplies HCs from the fuel injection valve 21, HCs are supplied only to the oxidation catalyst 17 located in the outer circumferential side. Heat is generated in an oxidation reaction of the HCs, and then the heat raises the temperature of the catalyst-supported DPF 14, so that PM can be burned and removed.

Further, the system for exhaust gas purification 1 in FIG. 1 is a system including the NOx catalyst 12 of the selective reduction type and the NOx catalyst 13 of the occlusion reduction type. Accordingly, even in the case where the air-fuel ratio rich control is performed by HC injection from the fuel injection valve 21 for the purpose of restoring the NOx occlusion capacity, HCs can be supplied as a reductant from the fuel injection valve 21.

In the exhaust gas purifier 10 having the above-described constitution, urea and HCs can be independently supplied from the passages 16 and 18, respectively, which are disposed in parallel to each other. For this reason, a short and compact exhaust gas purifier can reconcile urea injection into the exhaust pipe with direct injection of HCs into the exhaust pipe.

Then, at the time of urea supply through the urea injection valve 20, urea is hydrolyzed by the hydrolysis catalyst 15 to generate ammonia, and thus generated ammonia can be supplied to the NOx catalyst 12 of the selective reduction type. Further, NO in exhaust gas is oxidized by the oxidation catalyst 17 to NO$_2$, thereby bringing NO: NO$_2$ close to 50:50; thus, the NOx reduction efficiency in the NOx catalyst 12 of the selective reduction type can be increased.

Further, in the air-fuel ratio rich control for DPF regeneration, when HCs are injected by the fuel injection valve 21, HCs are oxidized by the oxidation catalyst 17, and the heat generated by the oxidation can raise the temperature of the exhaust gas flowing into the catalyst-supported DPF 14. Accordingly, PM trapped by the catalyst-supported DPF 14 can be efficiently burned and then removed.

Further, when at least one of the support of the hydrolysis catalyst 15 and the support of the oxidation catalyst 17 is formed with a support having a function of mixing exhaust gas, in the exhaust gas downstream of these catalysts 15 and 17, ammonia and heat dissipate and flow into the NOx catalyst 12 of the selective reduction type and the catalyst-supported DPF 14 which are located downstream. Therefore, purification of NOx in the exhaust gas can be efficiently carried out, and PM can be efficiently burned and removed in the catalyst-supported DPF 14.

Here, even when the partition 19 is disposed between these catalysts 15 and 17 all over both of the catalysts 15 and 17 with regard to the flow direction of the exhaust gas, the flow direction of the exhaust gas coming out from the catalysts 15 and 17 is diversified, thereby generating a mixing effect. Therefore, efficiencies in NOx purification and DPF regeneration can be improved.

The exhaust gas purifier and the system for exhaust gas purification of the present invention which have excellent effects as described above can be disposed in internal combustion engines and the like mounted in vehicles, and can be used extremely effectively in a system for NOx gas purification which includes a NOx catalyst of the selective reduction type and a DPF and performs injection of urea water and direct injection of fuel into an exhaust pipe.

What is claimed is:

1. An exhaust gas purifier which includes a NOx catalyst of a selective reduction type and a diesel particulate filter arranged in series to each other, and which is disposed in an exhaust passage of an internal combustion engine, wherein the exhaust gas purifier comprises:
    a passage for urea supply having a hydrolysis catalyst therein and a passage for hydrocarbon supply having an oxidation catalyst therein, the passages being parallel to each other on an upstream side of both the NOx catalyst of the selective reduction type and the diesel particulate filter,
    wherein the passage for urea supply and the passage for hydrocarbon supply are independent of each other,
    wherein the passage for hydrocarbon supply and the passage for urea supply branch off from the same exhaust passage, and
    wherein the passage for hydrocarbon supply is arranged in an outer circumferential side of the passage for urea supply;
    a urea feeder which supplies urea only to the passage for urea supply; and
    a hydrocarbon feeder which supplies hydrocarbon only to the passage for hydrocarbon supply.

2. The exhaust gas purifier according to claim 1, wherein the hydrolysis catalyst and the oxidation catalyst are disposed in a same cross-sectional surface of the exhaust passage, and
    a partition which separates exhaust gas flowing into the hydrolysis catalyst and the oxidation catalyst, and is disposed any one of, with respect to a flow direction of the exhaust gas: all over both of the catalysts or a part thereof in the upstream side thereof; only upstream of both of the catalysts; or from the upstream of both of the catalysts to all over both of the catalysts or to a part of the upstream side thereof.

3. The exhaust gas purifier according to claim 1 or 2, further comprising:
    a NOx catalyst of the occlusion reduction type in series with the NOx catalyst of the selective reduction type and the diesel particulate filter.

4. The exhaust gas purifier according to claim 1 or 2, wherein the diesel particulate filter includes a catalyst-supported diesel particulate filter having an oxidation catalyst and a particulate matter oxidation catalyst.

5. The exhaust gas purifier according to claim 1 or 2, wherein at least one of a support of the hydrolysis catalyst and a support of the oxidation catalyst has a function of mixing exhaust gas.

6. The exhaust gas purifier according to claim 5, wherein the at least one support is metal.

7. A system for exhaust gas purification, comprising the exhaust gas purifier according to claim 1 or 2.

* * * * *